Figure 1:
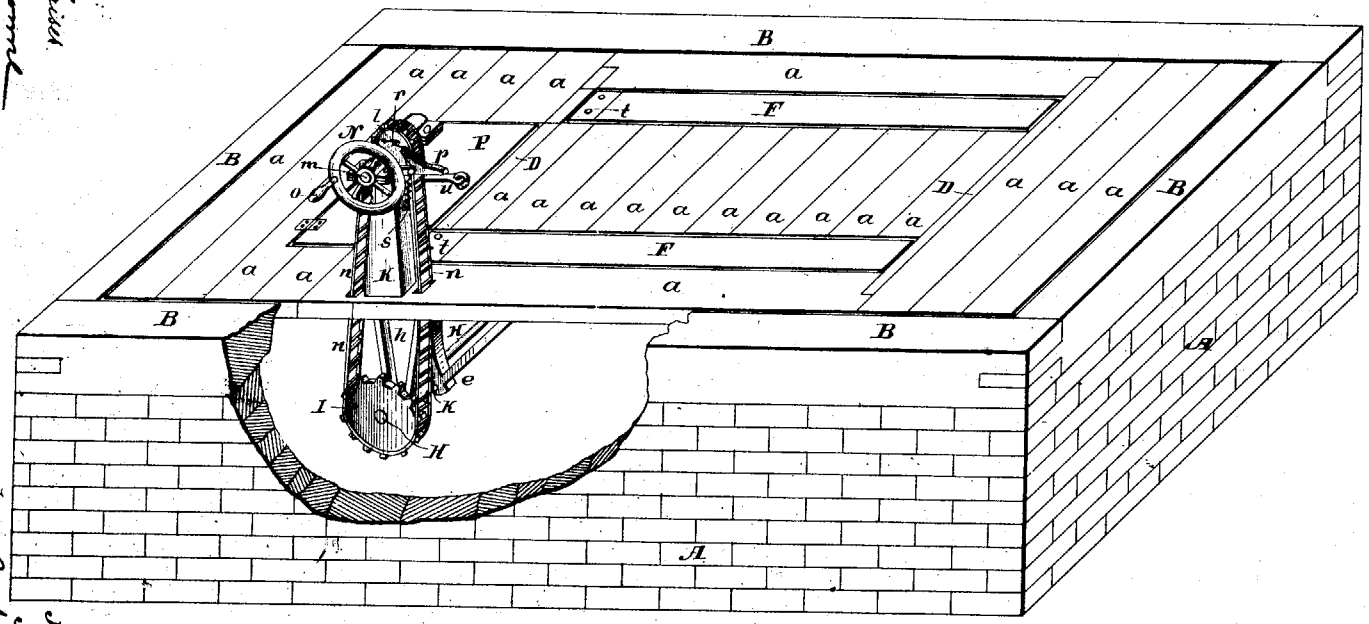

J. T. SAVAGE & J. LOVE

2 Sheets—Sheet 1

DUMPING PLATFORM.

No. 10,389

Reissued Oct. 2, 1883.

Witnesses:

J. Henry Kaiser

F. L. Brome

Inventors:

John T. Savage

John Love, by J. MacCrate atty.

2 Sheets—Sheet 2.

J. T. SAVAGE & J. LOVE.

DUMPING PLATFORM.

No. 10,389. Reissued Oct. 2, 1883.

Witnesses:
J. Henry Kaiser
D. L. Rumsel

Inventors:
John T. Savage
John Love
by J. Mac Petrie
Atty

UNITED STATES PATENT OFFICE.

JOHN T. SAVAGE AND JOHN LOVE, OF ROCKFORD, ILLINOIS.

DUMPING-PLATFORM.

SPECIFICATION forming part of Reissued Letters Patent No. 10,389, dated October 2, 1883.

Original No. 268,943, dated December 12, 1882. Application for reissue filed August 13, 1883.

*To all whom it may concern:*

Be it known that we, JOHN T. SAVAGE and JOHN LOVE, citizens of the United States, residing in the city of Rockford, in the county of Winnebago and State of Illinois, have invented new and useful Improvements in Dumping-Platforms, of which the following is a specification.

This invention relates to dumping-platforms employed most usually in connection with the ordinary weighing-scales of elevators, for the purpose of unloading grain from the vehicles employed in its transportation to the scales and elevators; and said invention consists, mainly, in the employment of mechanism, in connection with the dumping-platform of the scales, for moving said platform from a horizontal to an inclined position, and vice versa, to produce an efficient contrivance.

The devices employed and represented in the drawings, as well as their application and the mode of operation of the contrivance, will be hereinafter more fully described.

Figure 3:
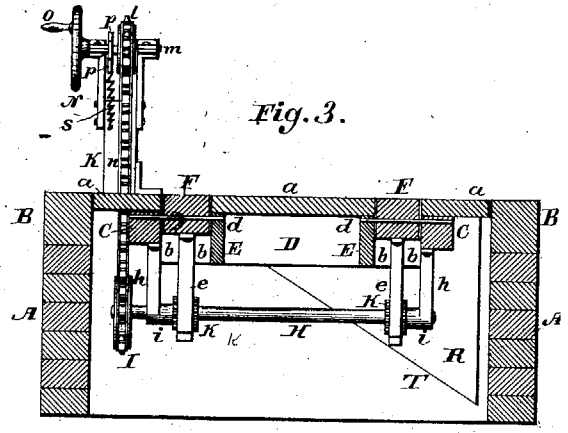
Figure 2:
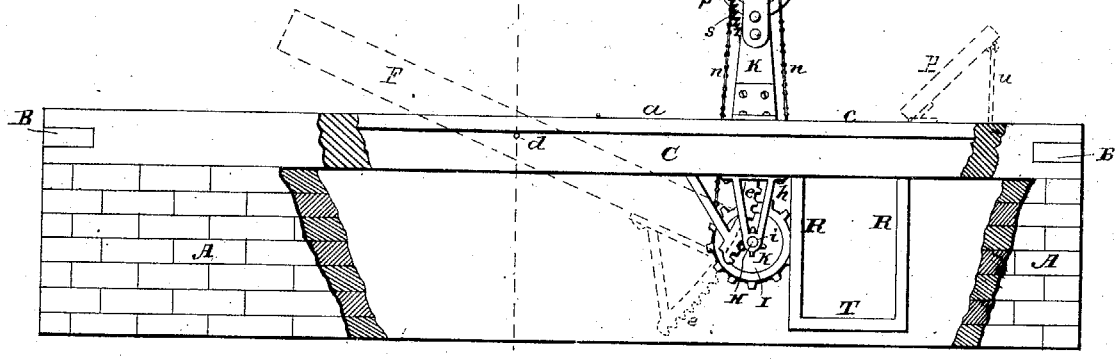

In the accompanying drawings, Figure 1 is an isometrical representation of a dumping-platform embodying our invention. Fig. 2 is a side elevation with portions broken away to show the construction of parts in the pit. Fig. 3 is a transverse vertical section on dotted line *x*.

In the figures, A represents the pit-walls of an ordinary weighing-scale—such as are to be found employed in connection with elevators, in the hay-market, or other like situations—employed mainly for weighing loaded vehicles and stock. On the pit-walls is mounted a border-frame consisting of side and end timber beams, B, rectangular in section, having their corner ends suitably joined at right angles by framing or otherwise, producing a rectangular capping-frame to the pit-walls and border-frame to a scale-platform.

At C are represented lengthwise wood side beams of a scale-platform. These beams are rectangular in section, and are joined toward the end portions by transverse beams D, having the upper end portions overlapping the side beams.

At E are represented lengthwise joists or floor-beams having their end portions suitably joined in the transverse beams D at a suitable distance inside of the side beams, C, producing a scale-platform frame.

At *a* are represented floor-planks, which are fixed to the upper surface of the scale-platform frame, leaving lengthwise side openings, *b*, between the lengthwise side beams, C, of the scale-platform and the lengthwise floor-beams or joists E, and also an end opening, *c*.

At F are represented track-beams of suitable dimensions to freely enter the lengthwise side openings, *b*. These track-beams are centrally supported in the side openings on suitable pivot-bolts, *d*, passed transversely through the side beams and floor-joists of the platform and through the track-beams.

At *e* is represented a spur-toothed segment-gear of bracket form, fixed to the under side of the end portions of the pivoted track-beams, from which they depend in a curve concentric with the pivotal center of the beam.

At *h* are represented bracket-bearings, one of which is fixed to the under face side of each side beam of the scale-platform, from which they depend. The lower end portions, *i*, of these brackets are fitted in journal-bearing form, adapted to receive the journal portion of a transverse shaft, H, which is fitted to revolve therein.

At *k* are represented spur-toothed gear-pinions, mounted upon the shaft H, to which they are fixed in such position that their gear-teeth shall engage the gear-teeth of the toothed segment in working contact.

At I is represented a sprocket-wheel fixed on the outward-projecting end of the transverse shaft H, on which the spur-toothed pinions are mounted.

At *l* is represented a sprocket-wheel fixed to the projecting end of a shaft, *m*, mounted to revolve in a bearing on the upper end of a pedestal, K. This pedestal K is of suitable dimensions, and is fixed on the upper face of the floor of the platform in such position that the sprocket-wheel *l*, mounted on its upper end, is substantially in the same vertical plane with the sprocket-wheel I on the transverse shaft H.

At *n* is represented a chain belt composed of suitable links to engage the teeth of the sprocket-wheels, and employed to connect the sprocket-wheels I and *l*, to transmit the movement of one of the wheels to the other.

At N is represented a hand-wheel fixed on the outward-projecting end of the shaft *m*, mounted on the pedestal. This hand-wheel is provided with a handle, *o*, fixed in the rim of the hand-wheel, and is capable of use as a winch to impart motion to the wheel.

At *p* is represented a lever-pawl pivoted to the pedestal in such position thereon that its pawl end will engage the teeth of a ratchet-wheel, *r*, fixed to the shaft *m* on the pedestal.

At *s* is represented a spring having a suitable connection with the lever-pawl *p* and with the pedestal in such a manner that its spring action will operate to hold the pawl in contact with the ratchet-wheel *r*. The free arm of the lever-pawl serves as a means by which an attendant may disengage the pawl from the ratchet-wheel. The rear ends of the track-beams F are provided with metallic portions *t*, securely fixed in place thereon and projecting rearward over said ends, and adapted to abut against the gear-toothed pinions, and thus limit the extent of motion of the beams. The rear transverse end beams, D, are shod with iron at points opposite the track-beams to receive the wheels of the vehicle.

At P is represented a hinged door, designed to close the end openings, *c*, and is capable of being raised on its hinged connection to its rearward-inclined position (represented in the dotted lines) and supported in such inclined position by means of a brace-link, *u*, having a link-joint connection centrally with its front edge portion.

At R is represented the sides and at T the bottom of an inclined spout-like portion, in this instance connected with the under side of the scale-platform, having its walls inclosing the opening *c* in such a manner as to receive whatever may be passed through the opening and conduct it on its inclined bottom T to a suitable receptacle, or into conductors to be conveyed to a suitable receptacle.

In the use of our improved dumping-platform the several movable parts thereof are brought into the position represented in Fig. 1, when it is prepared to receive a loaded vehicle, which is then driven onto the platform, where it may be weighed as usual, and is supported on the track-beams thereof. The hinged door is then raised and supported in the position shown in the dotted lines. The attendant then disengages the pawl from the ratchet, and by means of the hand-wheel, or of the handle fixed therein, will rotate the wheel in the direction indicated by the arrow, which movement will be imparted to the gear-toothed pinions by means of the chain-belt and sprocket-wheel connection with the shaft on which they are mounted, and the rotations of the pinions by means of their gear-toothed connection with the toothed segments will cause the track-beams to swing upon their pivotal supports to the inclined position shown in the dotted lines in Fig. 2, which movement will place the vehicle supported on the beams in the same inclined position. The end-gate of the vehicle is then removed or opened, when its contents will be discharged through the end opening into the inclined spout, to be conducted into a receptacle prepared for its reception. The door in the platform is then closed, and the hand-wheel revolved in the direction opposite to that indicated by the arrow, which movement will return the parts to their position shown in Fig. 1, in which position they will be held by means of the pawl engaging the ratchet-wheel. The unloaded vehicle is then weighed as usual and driven from the platform, and the apparatus is in position to receive another loaded vehicle, ready for another operation.

By this construction and arrangement of the parts we produce a simple and effective apparatus at a small cost, and in which we obviate the sudden jarring action or shock common in most dumping-platforms, and that is particularly injurious to the weighing mechanism. In this instance we have employed a sprocket-wheel and chain-belt movement by which to operate our improved dumping-platform; but instead thereof a shaft and the well-known miter or beveled toothed gear-wheels may be employed, or a shaft and screw-gear connection with the toothed segments may be employed, and still be within the scope of our invention.

We claim as our invention—

1. In combination with the track-beams or dumping portion of the contrivance and the ordinary scale-platform, means for operating or turning said track-beams from a horizontal to an inclined position, and vice versa, at the pleasure of the operator of said mechanism, all substantially as hereinbefore set forth.

2. The combination, with the gear-toothed segments fixed to the pivoted track-beams or dumping portion of the platforms, of spur-toothed gear-pinions to engage the gear-teeth of the segments, substantially as and for the purpose set forth.

3. The combination, with the spur-toothed gear-pinions, having a gear-toothed connection with the gear-toothed segments, of a sprocket-wheel and chain-belt connection therewith, substantially as and for the purpose set forth.

4. The combination, with the sprocket-wheel and chain belt connecting with the spur-toothed gear-pinions, of a hand wheel or winch to impart motion to the parts, substantially as and for the purpose set forth.

5. The combination, with the sprocket-wheel and chain belt connecting with the spur-toothed gear-pinions, of a ratchet-wheel and pawl mechanism, substantially as and for the purpose set forth.

6. The combination, with the pivoted track-beams or dumping portion of the platform, of detents operating to limit the descent of the dump, substantially as set forth.

JOHN T. SAVAGE.
JOHN LOVE.

Witnesses:
H. McFARLAND,
JOHN C. GARVER.